(12) United States Patent
Kumar et al.

(10) Patent No.: US 9,024,997 B2
(45) Date of Patent: May 5, 2015

(54) VIRTUAL PRESENCE VIA MOBILE

(75) Inventors: Saurabh Kumar, Jersey City, NJ (US);
Sorabh Saxena, Edison, NJ (US);
Anand K. Singh, Marlboro, NJ (US)

(73) Assignee: AT&T Intellectual Property L.L.P.,
Atlanta, GA (US)

( * ) Notice: Subject to any disclaimer, the term of this patent is extended or adjusted under 35 U.S.C. 154(b) by 365 days.

(21) Appl. No.: 12/875,501

(22) Filed: Sep. 3, 2010

(65) Prior Publication Data
US 2012/0056971 A1 Mar. 8, 2012

(51) Int. Cl.
| | |
|---|---|
| *H04N 7/15* | (2006.01) |
| *H04Q 11/00* | (2006.01) |
| *H04Q 7/20* | (2006.01) |
| *H04M 3/56* | (2006.01) |
| *H04L 29/06* | (2006.01) |
| *H04N 7/14* | (2006.01) |
| *H04W 4/02* | (2009.01) |
| *H04W 4/20* | (2009.01) |

(52) U.S. Cl.
CPC .............. *H04N 7/15* (2013.01); *H04M 3/567* (2013.01); *H04L 65/605* (2013.01); *H04L 65/403* (2013.01); *H04M 2201/38* (2013.01); *H04M 2203/252* (2013.01); *H04N 7/148* (2013.01); *H04W 4/02* (2013.01); *H04W 4/20* (2013.01)

(58) Field of Classification Search
USPC ...................... 455/456.1–414.4, 414.1–414.4; 348/14.01, 14.02, 14.08
See application file for complete search history.

(56) References Cited

U.S. PATENT DOCUMENTS

| | | | |
|---|---|---|---|
| 6,195,116 B1 * | 2/2001 | Lee ............................ | 348/14.09 |
| 6,774,928 B2 | 8/2004 | Bruzzone | |

(Continued)

FOREIGN PATENT DOCUMENTS

| | | | |
|---|---|---|---|
| EP | 1659794 | * | 5/2006 |
| EP | 1659794 A1 | * | 5/2006 |

(Continued)

OTHER PUBLICATIONS

Gibbon C. David: Clicker—An IPTV Remote Control in your cell phone, IEEE-2007.*

(Continued)

*Primary Examiner* — Duc Nguyen
*Assistant Examiner* — Theodore Ndje
(74) *Attorney, Agent, or Firm* — Hartman & Citrin LLC

(57) ABSTRACT

Devices, systems, and methods are disclosed for connecting a plurality of mobile devices in a videoconference over a cellular network via a videoconferencing server. At least one of the mobile devices includes a camera to capture a video of a participant in the videoconference. The video is transmitted to the videoconferencing server on the cellular network. The videoconferencing server edits the video and sends the edited video to receiving mobile devices in real-time. The receiving mobile devices output the video as a projection by using an internal mobile projector or transmit the video to an external display device. A sending mobile device may also act as a receiving mobile device, such that each of the participants may view video of other participants in his/her own background/environment while communicating with the other participants. In some variations, the videoconferencing server removes the background from the video and may replace the background such that the images of participants are placed in front of a new background or in each other's background.

20 Claims, 9 Drawing Sheets

(56) References Cited

U.S. PATENT DOCUMENTS

| | | | |
|---|---|---|---|
| 7,227,567 B1 * | 6/2007 | Beck et al. | 348/14.07 |
| 7,720,436 B2 * | 5/2010 | Hamynen et al. | 455/13.1 |
| 8,164,618 B2 * | 4/2012 | Yang et al. | 348/14.09 |
| 8,249,803 B2 * | 8/2012 | Yeh | 701/408 |
| 8,345,082 B2 * | 1/2013 | Tysso | 348/14.08 |
| 8,553,068 B2 * | 10/2013 | Taylor et al. | 348/14.09 |
| 2002/0027597 A1 | 3/2002 | Sachau | |
| 2005/0111388 A1 | 5/2005 | Kim | |
| 2006/0103721 A1 | 5/2006 | Shih et al. | |
| 2007/0273751 A1 | 11/2007 | Sachau | |
| 2008/0201208 A1 * | 8/2008 | Tie et al. | 705/10 |
| 2008/0261627 A1 * | 10/2008 | Manson et al. | 455/457 |
| 2008/0298571 A1 * | 12/2008 | Kurtz et al. | 379/156 |
| 2009/0167870 A1 * | 7/2009 | Caleca et al. | 348/207.1 |
| 2009/0249244 A1 * | 10/2009 | Robinson et al. | 715/781 |
| 2010/0103379 A1 * | 4/2010 | Fiess | 353/7 |
| 2011/0065423 A1 * | 3/2011 | Karaoguz et al. | 455/414.2 |
| 2011/0249077 A1 * | 10/2011 | Abuan et al. | 348/14.02 |
| 2012/0013705 A1 * | 1/2012 | Taylor et al. | 348/14.08 |

FOREIGN PATENT DOCUMENTS

| | | |
|---|---|---|
| WO | WO 2007/119901 | * 10/2007 |
| WO | WO 2007119901 A1 | * 10/2007 |

OTHER PUBLICATIONS

Hee, Video call service system using a digital set-top box WO 2007119901 A1, Publication date: Oct. 25, 2007, Priority date Apr. 14, 2006.*

* cited by examiner

VIRTUAL PRESENCE VIA MOBILE

BACKGROUND OF THE INVENTION

1. Field of the Invention

The present invention relates to mobile devices. In particular, the present invention relates to enhanced video calling between mobile devices by bringing a calling and a called party into the same environment for virtual presence.

2. Background of the Invention

Mobile devices, such as cellular telephones, are more and more ubiquitous in today's world. More powerful mobile devices with advanced features, such as smartphones having cameras and projectors, enable various types of communication services beyond the traditional voice calls. Mobile devices are now an important tool for both business and personal uses.

Videoconferencing has become another important tool for business in today's world. Videoconferencing allows two or more locations to interact via two-way video and audio transmissions simultaneously. Videoconferences enable participants to "meet" face-to-face without being required to travel to the same location. These videoconferences add a personal touch not found with telephone conferences and save businesses an enormous amount of money.

Videoconferencing, or video chat, is also now possible over the internet through applications on personal computers. These applications provide a way for many different types of individuals to communicate over long distances. For instance, friends and families are frequently dispersed around the country or world. Video chats allow these individuals to stay in touch and see each other while communicating.

However, many individuals do not have all of the necessary equipment for videoconferencing. Further, individuals may be away from their computer and thus unable or unwilling to participate in videoconferencing. For instance, when an individual is at home or otherwise away from work, the individual may not want to videoconference, as the background of the videoconference may inherently disclose the location of the individual. These and other instances limit the uses of current video chat and videoconferencing methods and systems.

What is therefore needed is a device, system, or method to utilize a mobile device for videoconferencing wherein the outputted video is easily visible and the location of a participant may be disguised and at the same time participants will find each other in same environment through virtual presence

SUMMARY OF THE INVENTION

The present invention solves the above problems by connecting a plurality of mobile devices in a videoconference over a cellular network via a videoconferencing server. At least one of the mobile devices includes a camera to capture a video of a participant in the videoconference. The video is transmitted to the videoconferencing server on the cellular network. The videoconferencing server extracts the foreground of the video and sends the edited video to receiving mobile devices in real-time. The receiving mobile devices output the video as a two-dimensional or three-dimensional projection by using an internal projector. The receiving mobile device may also transmit the video to an external display device. A sending mobile device may also act as a receiving mobile device, such that each of the participants may view video of other participants while communicating with the other participants. In embodiments of the invention, the videoconferencing server removes the background from the video and may replace the background such that the images of participants are placed in front of each other's background or a new background In one exemplary embodiment, the present invention is a mobile device for videoconferencing, the mobile device including a processor, a camera in communication with the processor, a cellular transceiver in communication with the processor to enable communication with a cellular network, a memory in communication with the processor, and a videoconferencing logic on the memory. The videoconferencing logic instructs the mobile device to record a captured video using the camera and stream the captured video to a videoconferencing server on the cellular network via the cellular transceiver. The videoconferencing server receives the captured video, extracts a foreground of the captured video to create an output video including the foreground, and streams the output video to a plurality of mobile devices which display the output video in real-time.

In another exemplary embodiment, the present invention is a system for mobile videoconferencing. The system includes a cellular network, a first mobile device in communication with the cellular network, the first mobile device recording a first captured video, a videoconferencing server on the cellular network, and a second mobile device in communication with the cellular network. The first mobile device transmits the first captured video to the videoconferencing server through the cellular network, the videoconferencing server receives the first captured video and edits the first captured video to create an output video, the videoconferencing server transmits the output video to the second mobile device, and the second mobile device displays the output video in real-time. An external display device in communication with the second mobile device may be used to display the output video.

In yet another exemplary embodiment, the present invention is a method of videoconferencing on mobile devices. The method includes connecting a first mobile device and a second mobile device in a videoconference over a cellular network, receiving a captured video from the first mobile device, editing the captured video to create an output video, and transmitting the output video to the second mobile device, wherein the second mobile device displays the output video in real-time. The editing further comprises removing a captured background from the captured video and replacing the captured background with a selected background

DETAILED DESCRIPTION OF THE INVENTION

Figure 1:
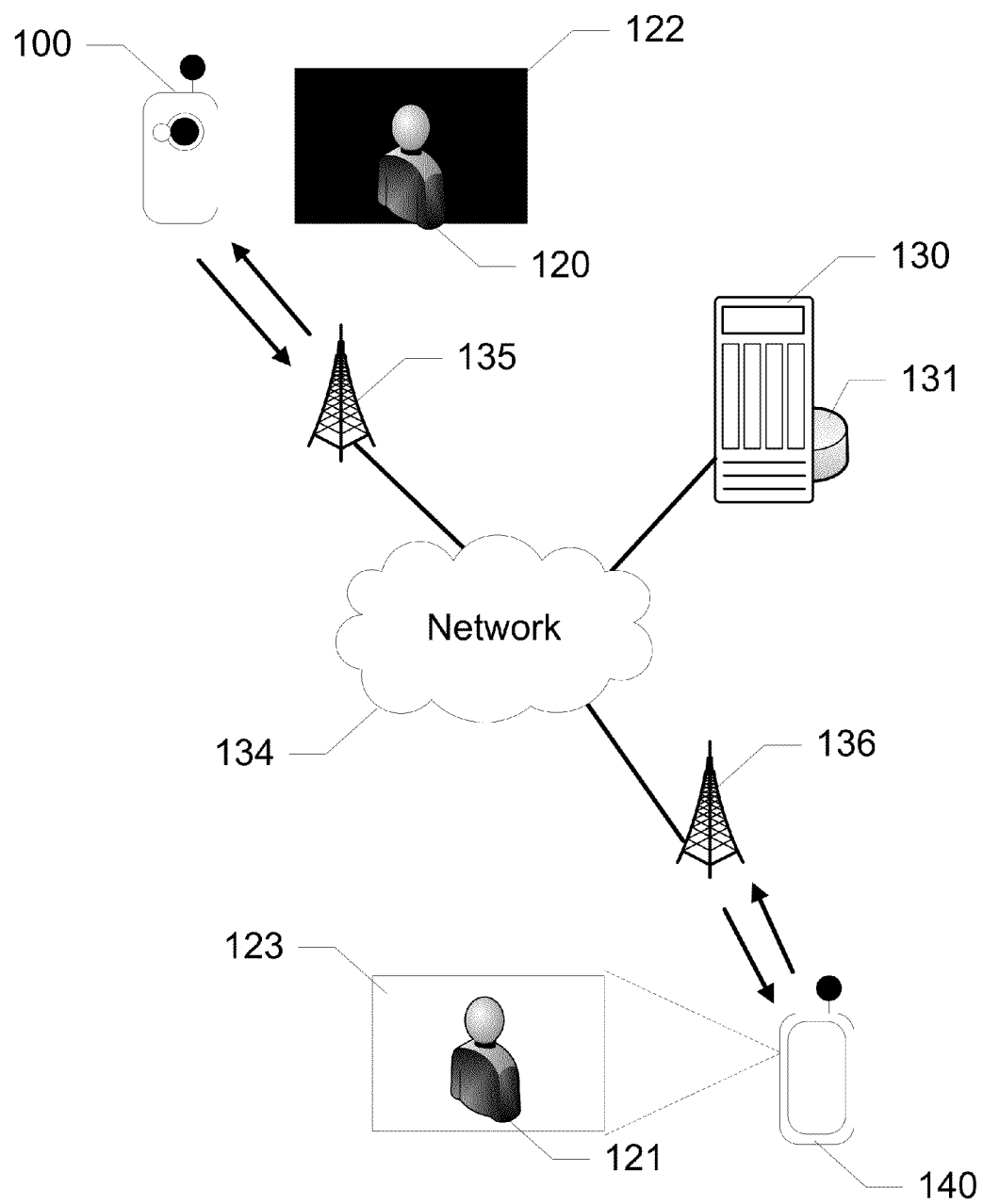
FIG. 1 shows a system for videoconferencing using mobile devices, according to an exemplary embodiment of the present invention.

The present invention presents devices, systems, and methods for videoconferencing on mobile devices. A videoconferencing server connects a plurality of mobile devices in a videoconference over a cellular network. At least one of the mobile devices includes a camera to capture a video of a participant in the videoconference. The video is transmitted to the videoconferencing server on the cellular network. The videoconferencing server edits the video and sends the edited video to receiving mobile devices in real-time. The receiving mobile devices output the video as a projection by using an internal projector or transmit the video to an external display device. A sending mobile device may also act as a receiving mobile device, such that each of the participants may view video of other participants while communicating with the other participants. In embodiments of the invention, the videoconferencing server removes the background from the video and may replace the background such that the images of participants are placed in front of a new background.

"Mobile device", as used herein and throughout this disclosure, refers to any electronic device capable of wirelessly sending and receiving data. A mobile device may have a processor, a memory, a transceiver, an input, and an output. Examples of such devices include cellular telephones, personal digital assistants (PDAs), portable computers, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories).

"Logic" as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

Mobile devices communicate with each other and with other elements via a network, for instance, a wireless network, or a wireline network. A "network" can include broadband wide-area networks such as cellular networks, local-area networks (LAN), and personal area networks, such as near-field communication (NFC) networks including BLUETOOTH®. Communication across a network is preferably packet-based; however, radio and frequency/amplitude modulations networks can enable communication between mobile devices using appropriate analog-digital-analog converters and other elements. Communication is enabled by hardware elements called "transceivers." Mobile devices may have more than one transceiver, capable of communicating over different networks. For example, a cellular telephone can include a cellular transceiver for communicating with a cellular base station, a Wi-Fi transceiver for communicating with a Wi-Fi network, and a BLUETOOTH® transceiver for communicating with a BLUETOOTH® device. A network typically includes a plurality of elements that host logic for performing tasks on the network.

In modern packet-based wide-area networks, servers may be placed at several logical points on the network. Servers may further be in communication with databases and can enable communication devices to access the contents of a database. Billing servers, application servers, etc. are examples of such servers. A server can include several network elements, including other servers, and can be logically situation anywhere on a service provider's network, such as the back-end of a cellular network. A server hosts or is in communication with a database hosting an account for a user of a mobile device. The "user account" includes several attributes for a particular user, including a unique identifier of the mobile device(s) owned by the user, relationships with other users, application usage, location, personal settings, business rules, bank accounts, and other information. A server may communicate with other servers on different networks to update a user account.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIG. 1 shows a system for videoconferencing using mobile devices, according to an exemplary embodiment of the present invention. In this embodiment, the system includes a first mobile device 100, a second mobile device 140, a cellular network 134, and a videoconferencing server 130 on cellular network 134.

First mobile device 100 includes a camera for capturing a video of a user 120 and at least one transceiver to transmit the captured video to cellular network 134. The captured video may be two dimensional or three dimensional, depending upon the capabilities of the camera and mobile device 100. As shown, user 120 is positioned in front of a captured background 122. Captured background 122 is the background behind user 120 at the time the video of user 120 is being captured. For example, user 120 may be located in a home office. Captured background 122 would include parts of the home office located behind user 120 or objects located behind user 120 which are within the frame of the video captured by first mobile device 100. The audio from user 120 may be captured by a microphone of first mobile device 100 or from an external device in communication with first mobile device 100. First mobile device 100 transmits the audio along with the captured video taken of user 120 to videoconferencing server 130 on cellular network 134 via a first base transceiver station (BTS) 135.

Cellular network 134 provides a radio network for communication between devices, including first mobile device 100 and second mobile device 140. Wireless carriers typically provide service to a geographic market area by dividing the area into many smaller areas or cells. Each cell is serviced by a radio transceiver, such as base transceiver stations 135 and 136. Base transceiver stations 135 and 136 connect to other elements of a cellular network that are known in the art and therefore not shown. For instance, base transceiver stations 135 and 136 connect to Mobile Switching Centers (MSCs) through landlines or other communication links, and the MSCs may, in turn, be connected via landlines to the Public Switched Telephone Network (PSTN), to other cellular networks, to IP networks, etc. Many other components are present in cellular network 134, but are not presented for sake of simplicity. These components will be apparent to one of ordinary skill in the art in light of this disclosure.

Videoconferencing server 130 is a server located on cellular network 134. Videoconferencing server 130 receives the audio and video from first mobile device 100 over cellular network 134. Videoconferencing server 130 includes logic to establish a videoconference connection between first mobile device 100 and second mobile device 140 via a cellular data connection across network 134. Videoconferencing server 130 also contains logic to edit the captured video, such as extracting and saving a foreground object, such as user 120, from the captured video received from first mobile device 100. By extracting the foreground object, captured background 122 may be removed and discarded such that it is not sent to second mobile device 140. This feature may be a default setting, provisioned by a request from user 120 via first mobile device 100, requested from second mobile device 140, etc. Thus, in the example above, the logic would remove the images of the home office of user 120 from the video, leaving an image of user 120. User 120 and user 120's actions remain on the video, as well as objects user 120 may be holding, and other objects positioned next to or in front of user 120. Using such image processing logic, videoconferencing server 130 allows user 120 to hide his or her present location from other parties of the videoconference. Videoconferencing server 130 may further add a new background behind the image of user 120. This background may be a default, may be selected by user 120 on first mobile device 100, may be selected on or by second mobile device 140, etc. With the appropriate background and foreground, videoconferencing server 130 compiles an output video. Videoconferencing server 130 sends the output video to second mobile device 140 via second base transceiver station 136. Videoconferencing server 130 may format the output video specifically for a certain type of second mobile device 140, for an external display device, etc.

Videoconferencing server 130 contains or is in communication with a database 131. Database 131 stores user profiles for participants in a videoconference, including user 120. The user profile may contain preferences, settings, etc. for participant, as well as other active or inactive users. These user profiles may be programmed by the participants through their respective mobile device, may be programmed using a personal computer, may be learned by videoconferencing server 130 based upon previous sessions, etc. The user profile may include an avatar for each user. This avatar may be a picture selected by the user, may be a video selected by the user, may be an image or video from a previous videoconference, etc. When initiating a videoconference, the avatar of the participant initiating the videoconference may be sent to other participants, notifying those participants of who is requesting the videoconference. Database 131 may also store a copy of a videoconference for later use and for a record of the videoconference. Thus, a participant or other user may be able to access the recorded videoconference at a later time.

The preferences and settings in the user profile may further include location and time settings. For instance, a participant may desire to remove the background from any video recorded by his device while at home or during non-work hours. The user may further adjust settings such that during business hours, or at the location of the office, any video streamed to the participant's mobile device includes a certain background. Video streamed at other times or locations include the original captured background from the other participants. These settings can be fixed by the user, or can be dynamically adjusted based on historical adjustments made by one or more users.

Second mobile device 140 includes a projector for projecting video or images onto a surface. When second mobile device 140 receives the output video from videoconferencing server 130, second mobile device 140 projects the output video from second mobile device 140 onto a surface. Depending upon the surface as well as the projection capabilities, the projected image may be two dimensional or three dimensional. The projected image includes a user image 121 of user 120 as well as a selected background 123. As stated above, the selected background may be a default, may be chosen by user 120 on first mobile device 100, may be chosen on or by second mobile device 140, etc. Second mobile device 140 also includes, or is in communication with an audio output such as a speaker to play the audio from user 120. When second mobile device 140 receives an invitation to a videoconference with first mobile device 100, second mobile device 140 may accept by pressing a button on second mobile device 140, by making a voice command, etc. Second mobile device 140 may also automatically accept an invitation from some or all callers. Such a feature may be programmed into the settings of second mobile device 140 on second mobile device 140, on videoconferencing server 130, etc. When a videoconference is automatically accepted, a live video image of the caller may be projected along with, or instead of, a ring, vibration, or push notification on second mobile device 140.

The entire process, from recording the captured video to displaying the output video occurs in real-time so that the participants in the videoconference may hold a conversation without undue pauses. To ensure the timeliness of the process, the quality of the videos transmitted may be dynamically adjusted due to the detected bandwidth. For instance, the video quality transmitted may be decreased when a low bandwidth is available and increased when a higher bandwidth is available. The video quality may be adjusted by one or more of the first mobile device 100, videoconferencing server 130, and second mobile device 140.

For simplicity, FIG. 1 only shows first mobile device 100 capturing a video and second mobile device 140 projecting the video. However, the process can flow either way, i.e. each mobile device may include both a camera to capture video and images as well as a projector to display an image. Both mobile devices 100 and 140 may also include sensors for capturing audio and outputs to play the audio from other participants in the videoconference. Thus, a videoconference may be conducted between first mobile device 100 and second mobile device 140, with each device sending and receiving video and audio.

Such a system may be useful in many situations. For instance, a junior associate may be sitting outside on his porch when he receives a request for a phone conference with his manager. However, the junior associate doesn't want his manager to know where he is, or even that he is not in the office. The junior associate accepts the connection while selecting a setting for only displaying foreground video to the other participants, in this case his manager. The junior associate may further select a background for the video to replace the image of the junior associate's porch. The junior associate's device records video and audio and streams this media to the videoconferencing server. The videoconferencing server removes the background from the video frames such that all that remains is the junior associate. The videoconferencing server then adds the selected background to the video image of the junior associate. Alternatively, the videoconferencing server adds the background of the manager to the video image of the junior associate as a default. This new version is sent to the manager's mobile device such that when displayed it looks as if the junior associate is front of the selected background. When the background of the manager is used, the default background, the manager finds his junior associate "virtually present" in front of him. The junior associate may also receive a video stream from the manager. As the junior associate may not have a computer or television nearby, and the device's display is fairly small, the junior associate uses projection capabilities of his phone to display the manager's video. This allows both parties to "meet" and participate in the phone conference.

In embodiments of the invention, the camera may be external to the mobile device. In such instances, the camera may be connected to the mobile device via a wired or a wireless connection. Wired connections can use Universal Serial Bus (USB) or other proprietary interfaces, while wireless connection may be established using WiFi, BLUETOOTH, WiMAX, NFC, Infrared, etc. Images, video, and/or sound may be captured by the camera and delivered to the mobile device via the wired or wireless connection. Alternatively, images and video may be captured by the camera while sound is recorded by the mobile device.

In embodiments of the invention, each mobile device may capture video of a respective user of the mobile device. The mobile device may project or otherwise display this video next to the video of the opposite user. Thus, both participants in the videoconference are displayed. Alternatively, when the mobile device sends a captured video to the videoconferencing server, the videoconferencing server combines the captured video with the captured video of the opposite user into a single video. After removing the backgrounds from behind each participant, the videoconferencing server may create a common background for both participants in the video. Thus, it may appear both participants are at the same location. Each participant may alternatively be displayed in front of the background selected by either participant or a default selection.

Additionally, while two mobile devices are shown, any number of mobile devices may be participants in a videoconference. The videoconferencing server may receive video streamed from each of the participating mobile devices and compile the videos into a single video. This single video may be transmitted to each of the participating mobile devices. Different videos may be transmitted to each of the participating mobile devices, depending upon whether the user of the mobile device has expressed the desire to display his or her own image/video along with the images/videos of the other parties. The single video may also be transmitted to third parties, such that these third parties may watch the videoconference without participating.

In embodiments of the invention, when one of the participating mobile devices senses a wireless network other than the cellular network in the mobile device's proximity, the mobile device may switch to the wireless network. Such a switch may provide the mobile device with a higher bandwidth, may alleviate congestion in the cellular network, etc. The alternate wireless network may be a femtocell, a Wi-Fi router connected to a broadband Internet connection, etc.

While two base transceiver stations are shown in this embodiment, it should be understood that a single base transceiver station would suffice when the first mobile device and second mobile device are both within the cell served by the single base transceiver station. Communications would be sent from the first mobile device to the videoconferencing server on the cellular network through the single base transceiver station and from the videoconferencing server to the second mobile device through the single base transceiver station.

The videoconferencing server may further be in communication with social networking sites such as FACEBOOK or LINKEDIN. The videoconferencing server may share avatars with such sites, may post content on such sites, such as by streaming to the site, etc.

Figure 2:
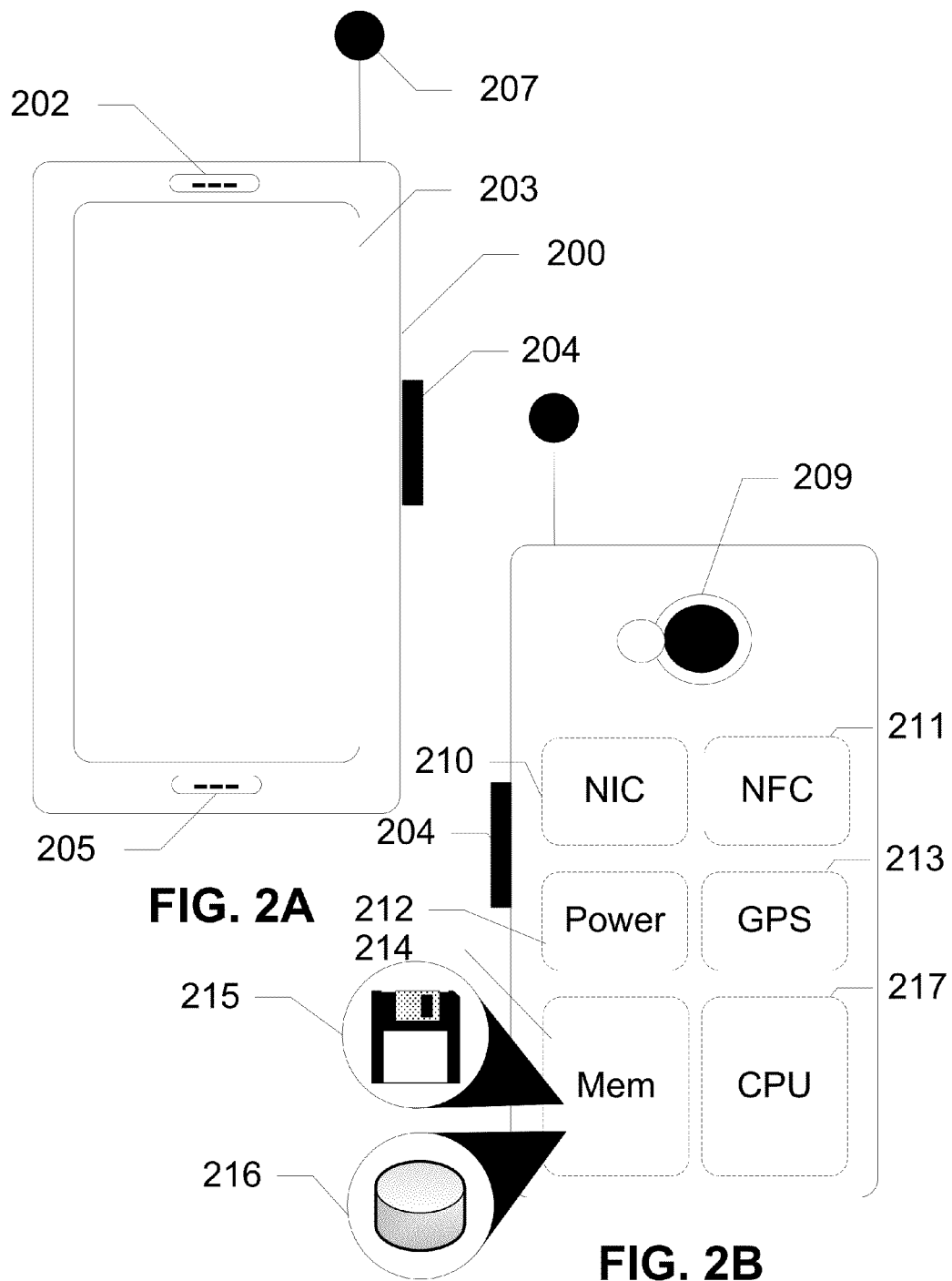
FIGS. 2A and 2B respectively show the external and internal components of a mobile device, according to an exemplary embodiment of the present invention.

FIGS. 2A and 2B respectively show the external and internal components of a mobile device 200, according to an exemplary embodiment of the present invention. Mobile device 200 includes a speaker 202, a display 203, a microphone 205, an antenna 207, a camera 209, and a projector 204. Mobile device 200 further includes a network interface (NIC) 210, a near-field communication (NFC) transceiver 211, a Global Positioning System (GPS) receiver 213, a power supply 212, a central processing unit (CPU) 217, and a memory 214. Camera 209 may be any optical sensor capable of capturing video. Depending upon the internal components of camera 209, camera 209 may be able to capture varying qualities of video, ranging from VGA (640×480 pixels) to high definition (HD) video. Speaker 202 provides an audio output for mobile device 200. Display 203 is an LCD or LED or other type of display on which a user can view selections, numbers, letters, etc. Display 203 allows the user to view video being recorded or video sent to mobile device 200. Display 203 can also be a touchscreen, thereby being used as an input device. In embodiments not using a touchscreen, a keypad is typically used as an input device, for instance, to type a phone number or a message. Such a keypad may be a numerical keypad, a QWERTY keyboard, etc. Microphone 205 allows the user to verbally communicate with others using mobile device 200. Microphone 205 may be used to capture audio of a videoconference. Projector 204 takes a video signal and projects the corresponding image using a lens system. Projector 204 may be adjusted to create a desired screen size and focus. These adjustments may be made via display 203 or a keypad to navigate an application or logic that controls the operation of projector 204. Antenna 207 is a transducer designed to transmit or receive electromagnetic waves to and from a network. In conjunction with antenna 207, network interface 210 allows mobile device 200 to wirelessly communicate with a cellular network or with other mobile devices across the cellular network. Network interface 210 may be a cellular transceiver, wireless transceiver, etc., and includes combinations of transceivers to communicate with assorted wireless networks. NFC transceiver 211 enables mobile device 200 to wirelessly communicate over short ranges with other NFC devices. NFC transceiver 211 can be, for instance, a BLUETOOTH® transceiver or a contactless integrated circuit card (CICC). GPS transceiver 213 enables a determination of a location of mobile device 200. Power supply 212 provides power to each of the components of mobile device 200, and can include a battery, as well as an interface to an external power supply. CPU 217 controls components of mobile device 200 according to instructions in logic stored on memory 214. Memory 214 comprises any computer readable medium, such as RAM, ROM, etc. Memory 214 stores videoconferencing logic 215, in addition to logic for operating the components of mobile device 200. Videoconferencing logic 215 contains instructions for capturing and receiving audio and video during a connected videoconference. Videoconferencing logic 215 may further contain instructions for compressing recorded video files before transmitting the video files and for decompressing received video files. Memory 214 further contains a videoconferencing database 216. Videoconferencing database 216 may contain user profile information, previous videoconferences, etc. Videoconferencing database 216 also contains rules related to how a GPS-determined location may be used in conjunction with pre-defined rules to produce a videoconference according to the preferences of the user. For instance, when a user is located at his or her house, the user may desire to remove the background from the videoconference.

The mobile device may further include an audio and/or video output port. This port allows the mobile device to connect with an external audio and/or video device via a wired connection. Various possible types of wired connections will be apparent to one of ordinary skill in the art in light of this disclosure.

In embodiments of the invention, adjustments to the projector's display may be made through hand motions of the user. The camera captures motions or gestures of the user's hands, with different motions or gestures corresponding to different adjustments. For instance, spreading the users hands apart may enlarge the display size.

Figure 3:
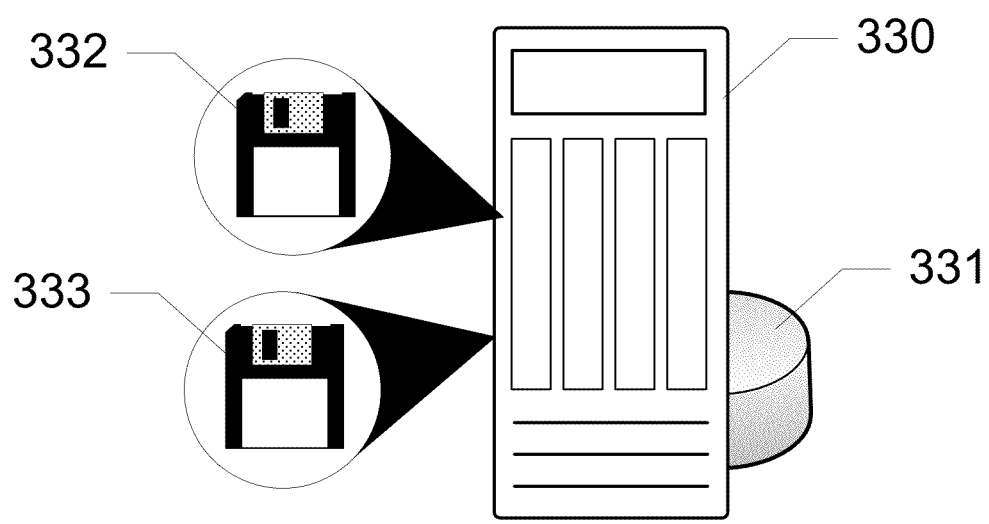
FIG. 3 shows a videoconferencing server for facilitating videoconferencing on mobile devices, according to an exemplary embodiment of the present invention.

FIG. 3 shows a videoconferencing server 330 for facilitating videoconferencing on mobile devices, according to an exemplary embodiment of the present invention. Videoconferencing server 330 is an application server located on a cellular network. Videoconferencing server 330 receives the audio and video from a mobile device over the cellular network. Videoconferencing server 330 contains connection logic 332 to establish a videoconference connection between a plurality of mobile devices. Connection logic 332 includes instructions for signaling and connecting each of the mobile devices as well as messages and/or other data sent with the signaling. Connection logic 332 includes instructions for determining preferences and settings for each of the plurality of mobile devices. Connection logic 332 also determines the capabilities of each of the devices as well as a strength of the signals between the mobile devices and the cellular network. Signal strengths may be used to adjust streaming rates for each mobile device. Videoconferencing server 330 also contains video logic 333 to extract and save a foreground from the mobile device. By extracting the foreground, the captured background may be removed such that it is not sent to the other mobile devices. This feature may be a default setting, a request from the sending mobile device, a request from recipient mobile devices, etc. The sending user's image and actions remain on the video, as well as objects the user is holding, and other objects positioned next to or in front of the user. Using video logic 333, videoconferencing server 330 allows the user to hide his or her present location from other participants in the videoconference. Videoconferencing server 330 may further add a new background behind the image of the user. This background may be a default, may be selected by the sending user, may be selected by the receiving mobile device, etc. With the appropriate background and foreground, videoconferencing server 330 compiles an output video. Videoconferencing server 330 sends the output video to the other mobile devices. Video logic 333 further includes instructions for the compression/decompression of video files when receiving a video stream or sending a video stream. Video logic 333 contains instructions for combining video streams into the output video stream. This output video stream may be different for each mobile device receiving a stream, depending upon stored preferences.

Videoconferencing server 330 contains or is in communication with a database 331. Database 331 stores user profiles for participants in a videoconference. The user profile may contain preferences, settings, etc. for the users. These user profiles may be programmed by the participants through their respective mobile device, may be programmed using a personal computer, may be learned by videoconferencing server 330 based upon previous sessions, etc. The user profile may include an avatar for each user. This avatar may be a picture selected by the user, may be a video selected by the user, may be an image or video from a previous videoconference, etc. When initiating a videoconference, the avatar of the participant initiating the videoconference may be sent to other potential participants, notifying those potential participants of who is requesting the videoconference. Database 331 may also store a copy of previous videoconferences for later use and for a record of the videoconferences. Thus, a participant or other user may be able to access the videoconference at a later time by accessing database 331.

Figure 4:
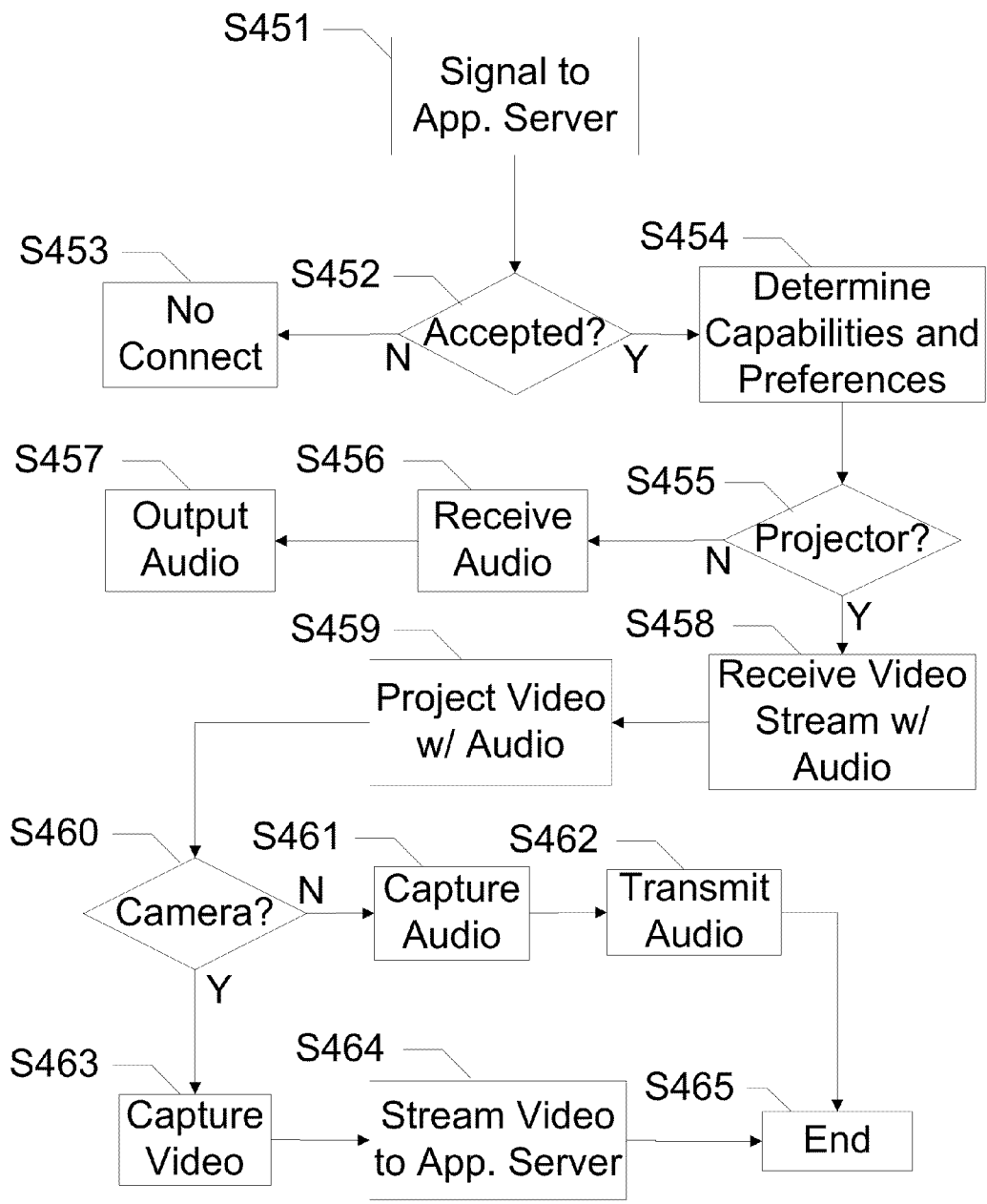
FIG. 4 shows a method of videoconferencing on a mobile device, according to an exemplary embodiment of the present invention.

FIG. 4 shows a method of videoconferencing on a mobile device, according to an exemplary embodiment of the present invention. In this embodiment, a user of the mobile device desires to participate in a videoconference with a second party. The user first signals S451 the desire for a videoconference connection to the second party to a videoconferencing server via the mobile device. It is then determined S452 whether the second party has accepted the videoconference. This may be determined by an acceptance or failure notification received from the videoconferencing server or by a signal from videoconferencing server. If the second party did not accept the videoconference, no connection is established S453 between the mobile device and the second party. If the videoconference is accepted, the mobile device determines S454 the capabilities and preferences of the mobile device and sends these capabilities and preferences to the videoconferencing server. It is determined S455 whether the mobile device has a projector or other display, or is in communication with a projector, television, etc. If the mobile device does not have any way to display the videoconference, the mobile device may only receive S456 an audio stream from the videoconferencing server. This ensures that system resources are not wasted. The mobile device outputs S457 the audio stream via a speaker, attached headset, etc. If the mobile device has, or is in communication with, a display device, the mobile device receives S458 an audio/video stream from the videoconferencing server. The mobile device outputs S459 the audio/video stream. The output S459 may be via the mobile device and/or devices in communication with the mobile device. It is further determined S460 whether the mobile device includes or is in communication with a camera. If the mobile device does not have a camera, the mobile device records S461 audio for the videoconference. The mobile device then transmits S462 an audio stream to the videoconferencing server. If the mobile device does have a camera, the mobile device captures S463 video and audio via the camera. The mobile device then streams S464 the audio and video to the videoconferencing server. When the user desires to terminate the videoconference, the mobile device signals S465 this desire to the videoconferencing server. This may be accomplished by an 'end' button, turning off the mobile device, etc.

Alternatively, the user may desire to participate in a videoconference with the second party after already being connected to the second party in a voice session. In this instance, during the voice session the user signals the videoconferencing server of the desire to establish a videoconference call via a command on the user's mobile device. If the second party accepts the videoconference, the videoconferencing server initiates a cellular data session between the devices and may terminate the voice session. If the videoconference is rejected by the second party, rather than not connecting the parties, the parties remain in the voice session.

In embodiments of the present invention, even if the mobile device does not have any way to display the video conference, both audio and video are sent if the mobile device settings specify this. This may be useful when the mobile device is recording the streamed video such that the recorded file may be played at a later time on another device or when video output devices are available.

In embodiments of the invention, the videoconferencing server may further transfer the connection between either of the parties and the videoconferencing server to a different data connection, such as WiFi, WiMAX, etc. when these connections are available. Such connections save resources in the cellular network and may provide the participants with higher bandwidth, allowing for a higher quality of video and audio.

Figure 5:
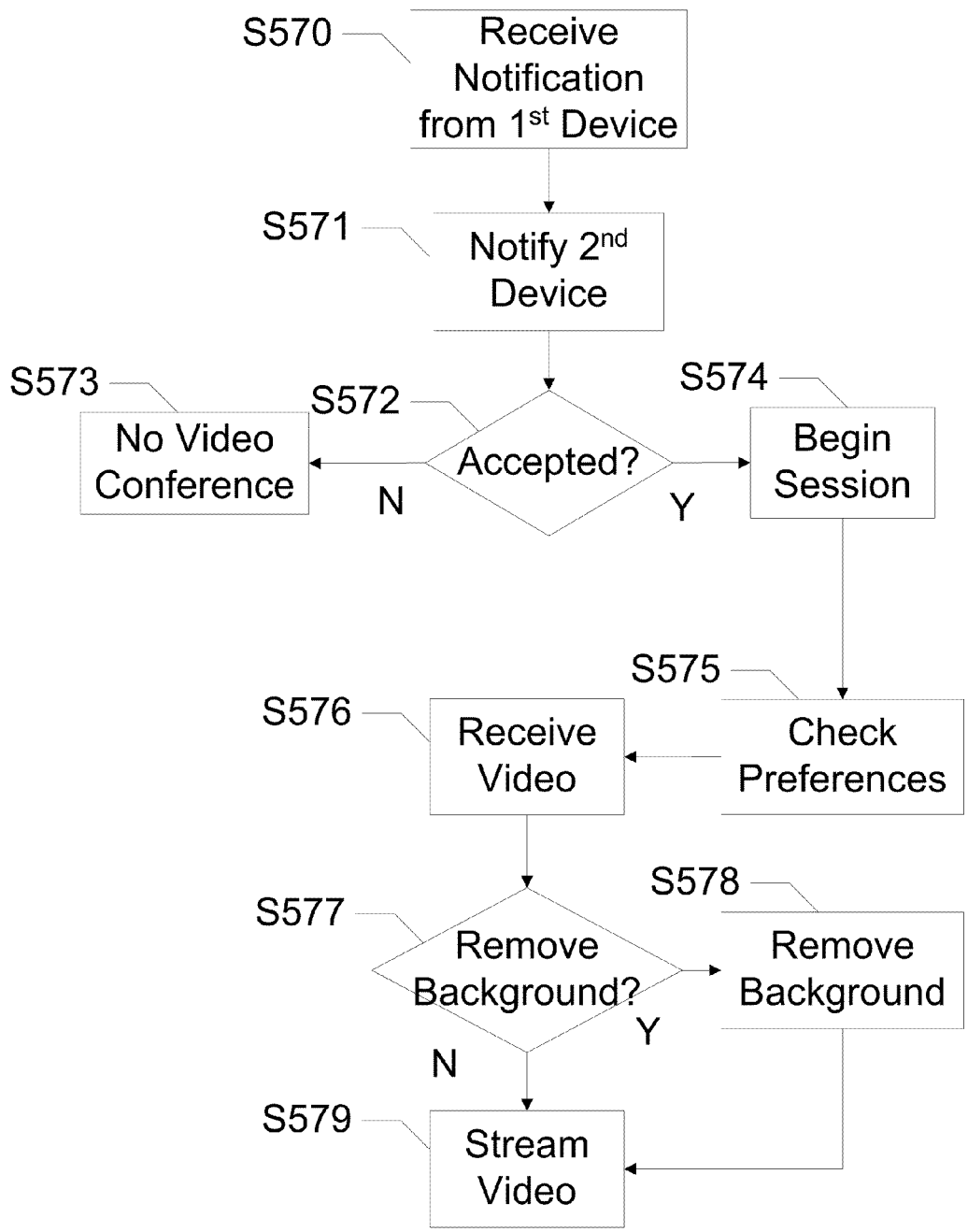
FIG. 5 shows a method of facilitating a videoconference on mobile devices, according to an exemplary embodiment of the present invention.

FIG. 5 shows a method of facilitating a videoconference on mobile devices, according to an exemplary embodiment of the present invention. In this embodiment, a videoconferencing server on a cellular network receives a notification S570 from a first mobile device indicating a desire by the first mobile device to connect to a second mobile device for a videoconference. This notification may be signaled to and received by the videoconferencing server using any form of signaling, such as session initiation protocol (SIP), etc. The videoconferencing server then signals S571 the second mobile device to invite the second mobile device to connect in the videoconference with the first mobile device. The videoconferencing server determines S572 whether the invitation has been accepted by the second mobile device. If the invitation was not accepted, a videoconference is not established S573. If the second mobile device has indicated a desire to instead connect via a voice connection, the cellular network may connect the first mobile device and the second mobile device in a voice connection. If the invitation was accepted, the videoconferencing server connects S574 the first mobile device and the second mobile device in a videoconference over a cellular data connection. The videoconferencing server then checks S575 the preferences, settings, and capabilities for the first mobile device and the second mobile device. Capabilities for the mobile devices include the ability to capture video, the type of display used by the device, signal strengths received by the mobile devices, etc. Preferences and settings may include a preferred streaming quality, whether or not the user wishes to receive a stream containing video of each participant in the videoconference, whether or not the device is contributing to the videoconference, whether or not the background should be removed from the video frame, a replacement background, etc. The videoconferencing server then receives S576 a video stream from the first mobile device and/or the second mobile device. The videoconferencing server references the preferences and settings to determine S577 whether the background should be removed from the received video. If the preferences and settings determine the background is to be removed, logic on the videoconferencing server extracts the foreground from the video and removes S578 the background. This may be accomplished by algorithms that will be apparent to one of ordinary skill in the art in light of this disclosure. A replacement background may be added according to the settings and preferences. The output video is then streamed S579 to each of the other connected mobile devices. If the background is not to be stripped, the video is streamed S579 to each of the other connected devices. This streamed video may be a combination of video streams from a plurality of connected devices, depending upon the preferences of the users.

Systems for mobile videoconferencing may further utilize external display devices. These devices may be used in instances where a mobile device does not have a sufficient display means. Alternatively, external display devices may simply provide a higher quality or different display. For instance, a large projection system may provide a better display than the mobile device when displaying a videoconference to a large audience. An external display device may also be, for instance, a set-top box for an IPTV. The IPTV may have a user channel dedicated to each user mobile number. A scheduling of such an event on an external display device may also be supported.

Figure 6:
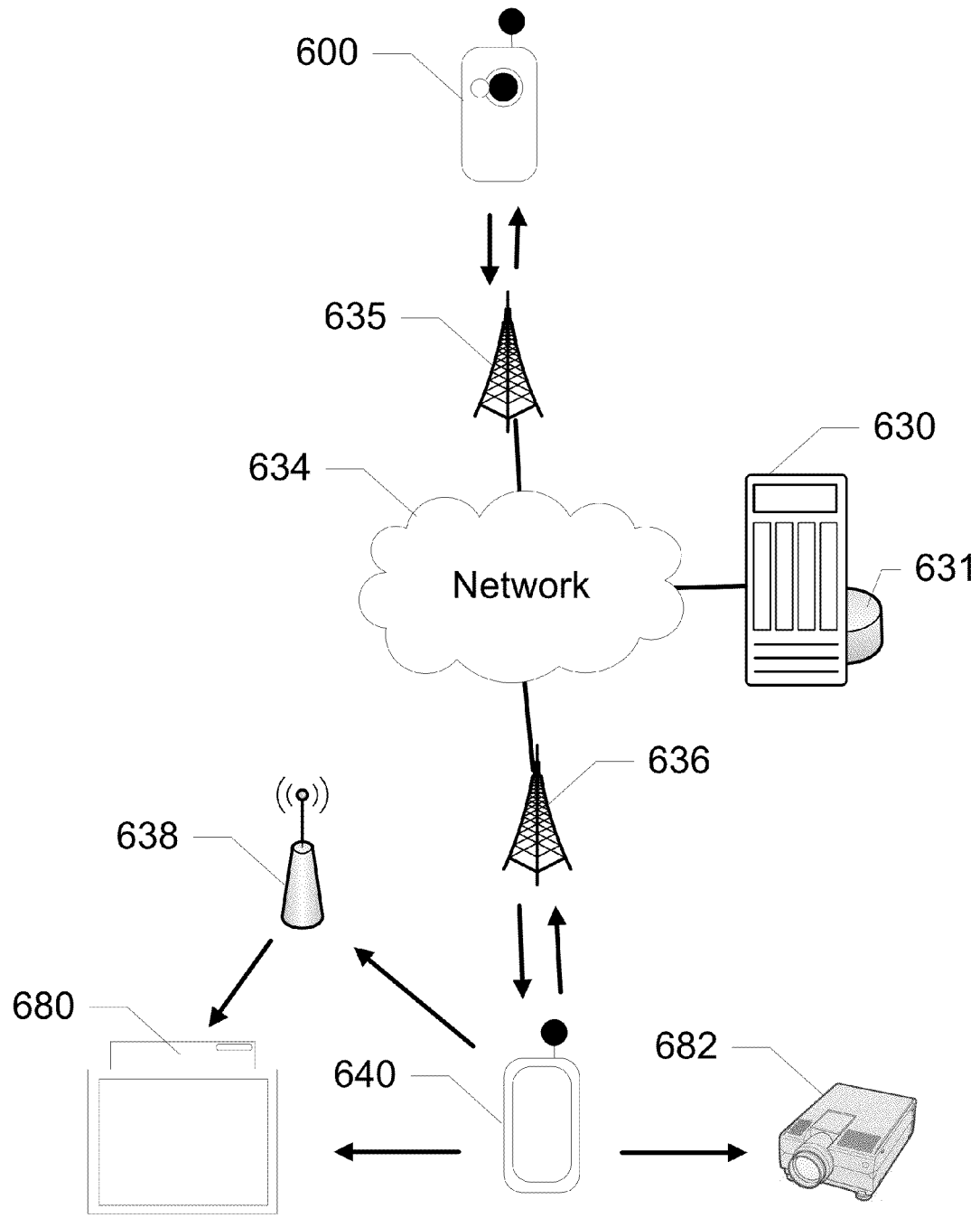
FIG. 6 shows a system for videoconferencing using mobile devices, according to an exemplary embodiment of the present invention.

FIG. 6 shows a system for videoconferencing using mobile devices, according to an exemplary embodiment of the present invention. In this embodiment, the system includes a first mobile device 600, a network 634, a videoconferencing server 630 on network 634, a second mobile device 640, and one or more external display devices. As in the exemplary embodiment shown in FIG. 1, first mobile device 600 captures a video and/or audio of a user. First mobile device transmits the video over a first BTS 635 to videoconferencing server 630 on network 634. As in FIG. 1, videoconferencing server 630 connects first mobile device 600 and second mobile device 640 in a videoconference over a data session. Videoconferencing server 630 also contains logic to extract and save a foreground from the captured video received from first mobile device 600. By extracting the foreground, the captured background may be removed such that it is not sent to second mobile device 640. This feature may be a default setting, a request from first mobile device 600, a request from second mobile device 640, etc. Videoconferencing server 630 may further add a new background behind the image of the user. This background may be a default, may be selected by the user on first mobile device 600, may be selected on or by second mobile device 640, etc. With the appropriate background and foreground, videoconferencing server 630 compiles an output video. Videoconferencing server 630 sends the output video to second mobile device 640 via second base transceiver station 636.

Videoconferencing server 630 contains or is in communication with a database 631. Database 631 stores user profiles for participants in a videoconference. The user profile may contain preferences, settings, etc. for the users. These user profiles may be programmed by the participants through their respective mobile device, may be programmed using a personal computer, may be learned by videoconferencing server 630 based upon previous sessions, etc. The user profile may include an avatar for each user. This avatar may be a picture selected by the user, may be a video selected by the user, may be an image or video from a previous videoconference, etc. When initiating a videoconference, the avatar of the participant initiating the videoconference may be sent to other participants, notifying those participants of who is requesting the videoconference. Database 631 may also store a copy of a videoconference for later use and for a record of the videoconference. Thus, a participant or other user may be able to access the recorded videoconference at a later time.

Second mobile device 640 receives the output video stream from videoconferencing server 630 via second base transceiver station 636. Second mobile device 640 is capable of at least one means of short range wireless communication, such as WiFi, BLUETOOTH, NFC, etc. and/or may include a video output for a wired connection to an external display device. Second mobile device 640 selects to forward the video stream to the selected external display device via a wired or wireless connection. The external display device is a television 680 with a set top box, a projector 682, a laptop computer, or equivalent means of receiving a video signal and displaying a corresponding video. When using a wireless connection, external device must be capable of communicating using the same method or protocol being used by second mobile device 640. When using a wireless communication such as BLUETOOTH, the communication may occur directly between second mobile device 630 and external device. Wireless communication such as WiFi may use an access point 638, such that both the external device and second mobile device 640 connect to a local area network (LAN). The external display device receives the video stream from second mobile device 640 and displays the video stream. Either the external display device, second mobile device 640, or a separate external device outputs the streamed audio for the videoconference.

Figure 7:
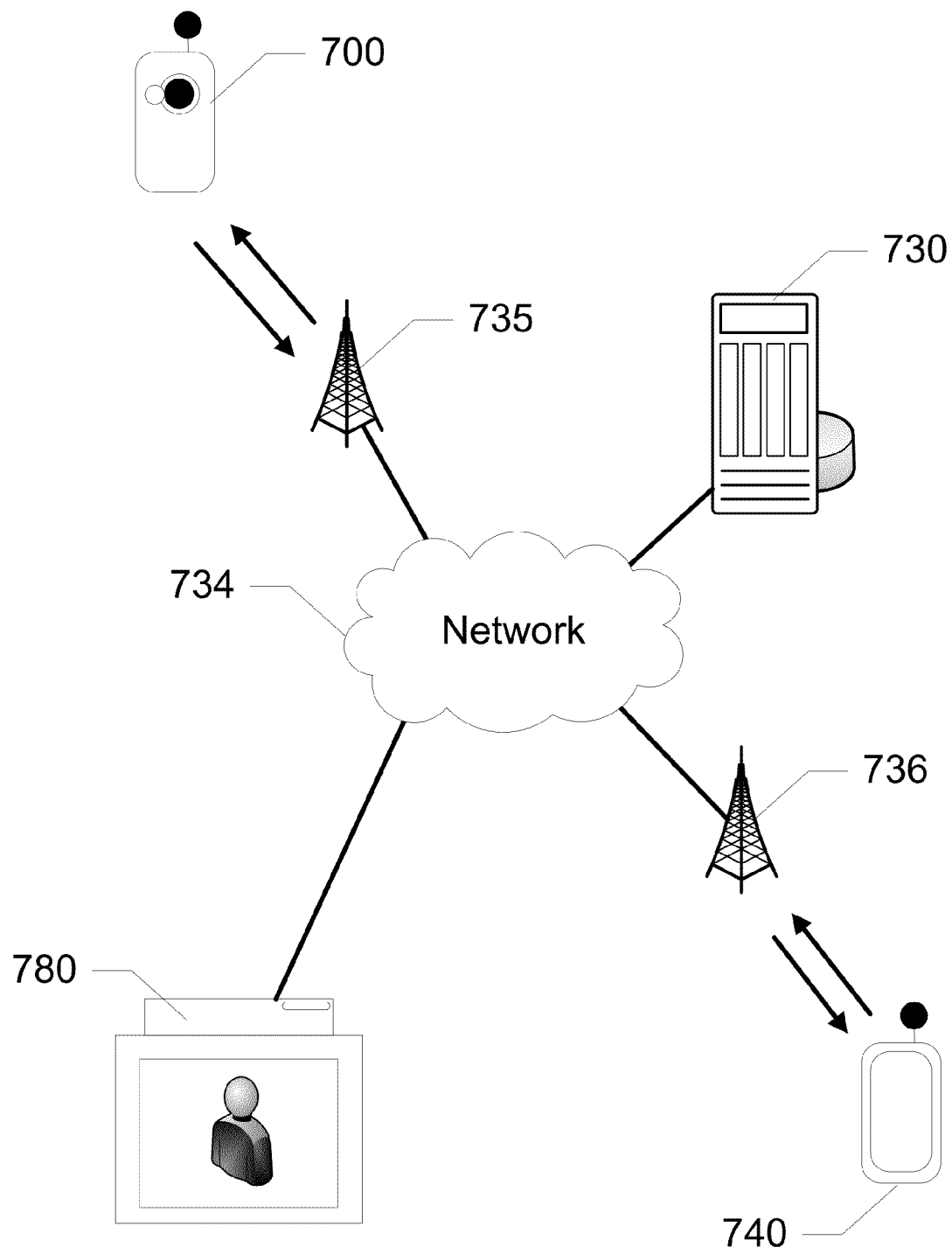
FIG. 7 shows a system for videoconferencing using mobile devices, according to an exemplary embodiment of the present invention.

FIG. 7 shows a system for videoconferencing using mobile devices, according to an exemplary embodiment of the present invention. In this embodiment, a first mobile device 700 and a videoconferencing server 730 include at least the features described above with respect to the exemplary embodiments of FIG. 1 and FIG. 6, with first mobile device 700 transmitting video to videoconferencing server 730 on cellular network 734 via a first base transceiver station 735. However, either in addition to or instead of sending the output video stream to second mobile device 740, videoconferencing server 730 sends the output video stream directly to set-top box 780 connected to a television, or another external display device. This may be a direct connection from videoconferencing server 730, or via components of cellular network 734. The transmission may be over a wired or wireless connection. Such a connection directly to the external display device may allow for a higher bandwidth and/or alleviate congestion on cellular network 734. Higher bandwidth provides a better picture and less cellular data usage from second mobile device 740 while saving resources of cellular network 734.

In embodiments of the invention, the videoconferencing server 730 begins by sending the output video stream to the second mobile device 740. The second mobile device 740 signals to the videoconferencing server 730 that the television is in proximity. The videoconferencing server 730 transfers the transmission containing the output video stream to set-top box 780 coupled to the television.

Figure 8:
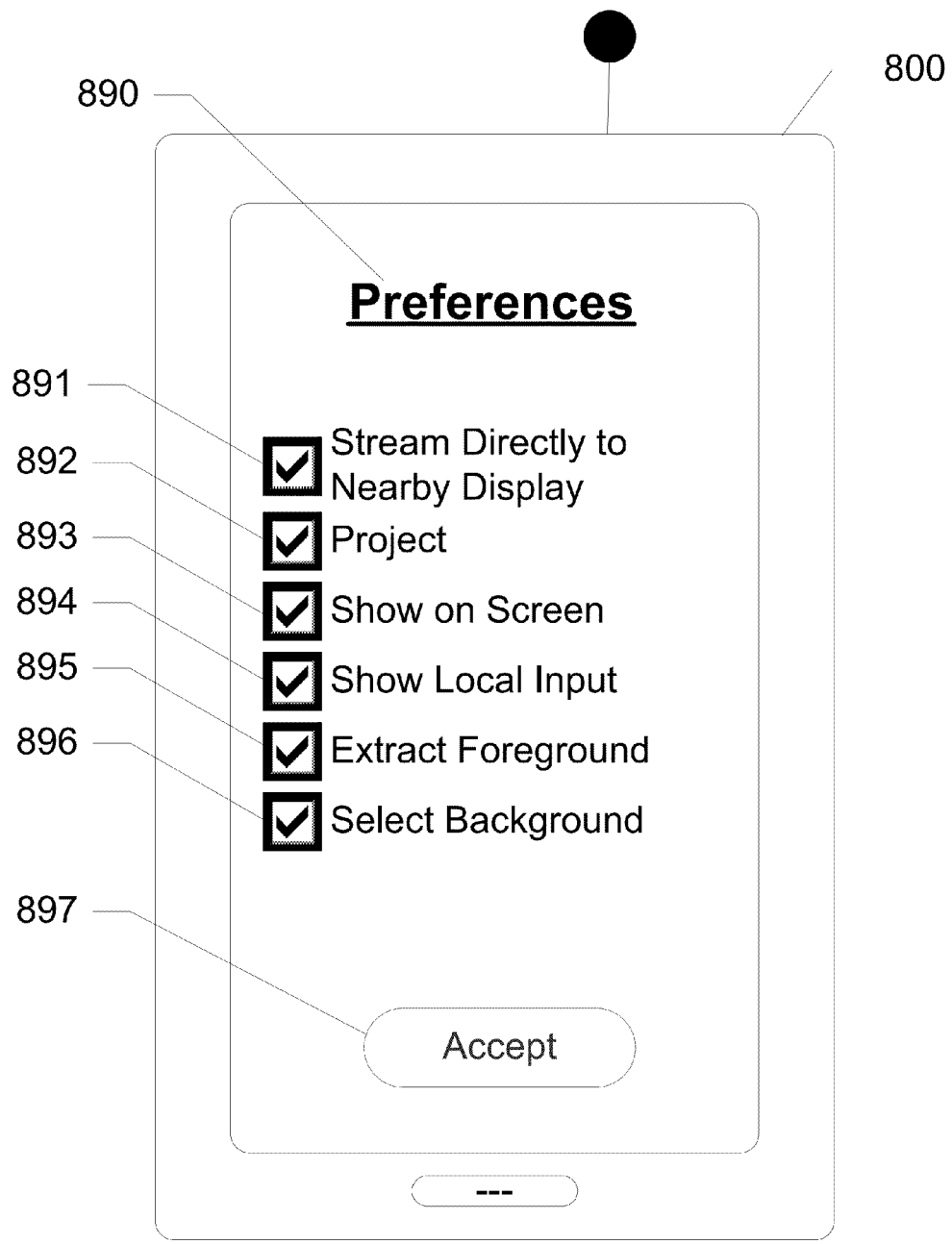
FIG. 8 shows an interface for controlling videoconferencing preferences, according to an exemplary embodiment of the present invention.

FIG. 8 shows an interface for controlling videoconferencing preferences 890, according to an exemplary embodiment of the present invention. In this embodiment, preferences 890 includes an ability to stream directly to a nearby display 891, an ability to project 892, an ability to show on screen 893, an ability to show a local input 894, an ability to extract a foreground 895, and an ability to select a background 896, each ability selected using a checkbox or other means. Stream directly to nearby display 891 instructs the videoconferencing server to stream a videoconference from the videoconferencing server to an external display device via a wired or wireless connection, depending upon the available connection. Project 892 instructs the videoconferencing server to stream to mobile device 800 and mobile device 800 projects the output video stream using an internal projector. Show on screen 893 instructs the videoconferencing server to stream to mobile device 800 and mobile device 800 displays the output video stream on a display of mobile device 800. Show local input 894 instructs the videoconferencing server to combine the video recorded by mobile device 800 into the output video stream. Extract foreground 895 instructs the videoconferencing server to extract the foreground from video recorded at mobile device 800 and remove the background. Select background 896 instructs the videoconferencing server to add a new background to the output video stream in place of the background in the recording from mobile device 800. This selection may open another window, allowing the user to choose a background. When the user has finished making selections, accept button 897 accepts the selections.

Figure 9A:
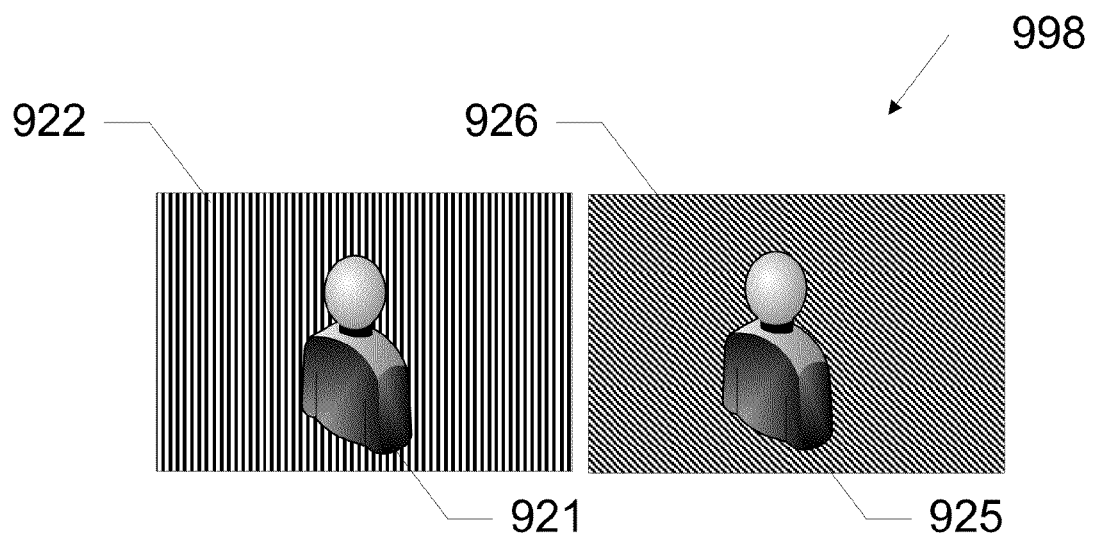
FIGS. 9A and 9B show output video streams of a videoconference, according to an exemplary embodiment of the present invention.
Figure 9B:
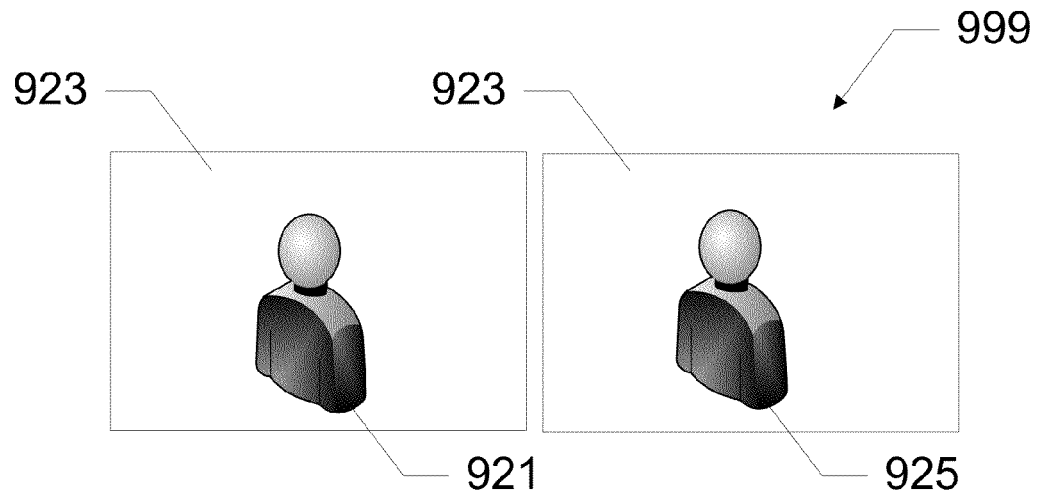

FIGS. 9A and 9B show output video streams of a videoconference, according to an exemplary embodiment of the present invention. As shown in FIG. 9A, an output video stream 998 includes the recorded background behind each of the participants in the videoconference. A first participant's image 921 is shown in front of a first captured background 922 while a second participant's image 925 is shown in front of a second captured background 926. This may be a default or may be selected by one of the participants. FIG. 9B shows an output video stream 999 with both participants in front of the same background. The background of each recorded video has been removed and has been replaced with a selected background 923. Selected background 923 may be selected by either participant, may be a default, etc. In the figure, first participant's image 921 and second participant's image 925 are both placed in front of selected background 923.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. For instance, communication between mobile devices and network elements can be accomplished by Internet Protocol (IP) addressing, Session Initiation Protocol (SIP) signaling over an IP Multimedia System (IMS), Voice over IP (VoIP), etc. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system comprising:
    a videoconferencing server comprising a processor; and
    a memory that stores computer-readable instructions that, when executed by the processor, cause the videoconferencing server to perform operations comprising
        receiving, from a mobile device, a streamed video captured by the mobile device using a camera of the mobile device, the streamed video comprising a background and a foreground and being received with a first setting and a second setting, the first setting indicating that only the foreground is to be displayed at a destination device and a second setting indicating selection of a background that is to be displayed at the destination device, the background being selected based upon a location of the mobile device;
receiving, from the mobile device, audio captured by the mobile device using a microphone located at the mobile device;
determining whether the destination device comprises a display device to display the streamed video;
if a determination is made that the destination device comprises the display device,
   determining that the background is to be removed from the streamed video based upon the first setting,
   extracting the foreground from the streamed video,
   identifying a further background for an output video comprising the foreground, the further background being identified based upon the second setting,
   compiling the further background and the foreground to create the output video comprising the further background and the foreground, and
   streaming the output video and the audio captured by the mobile device to the destination device communicating with the processor via a cellular network; and
if a determination is made that the destination device does not comprise the display device, streaming only the audio captured by the mobile device to the destination device.

2. The system of claim 1, wherein the display device comprises an external display associated with the destination device, and wherein the external display displays the output video.

3. The system of claim 2, wherein the external display associated with the destination device comprises an internet protocol television associated with a user mobile number associated with the destination device.

4. The system of claim 1, wherein the display device comprises a projector that projects the output video as three dimensional content.

5. The system of claim 1, wherein the computer-readable instructions, when executed by the processor, cause the videoconferencing server to perform operations further comprising:
   receiving a second captured video from the destination device;
   editing the second captured video to create an edited second captured video; and
   combining the edited second captured video in the output video.

6. A method comprising:
receiving, from a first mobile device and at a videoconferencing server comprising a processor, a streamed video captured by the first mobile device using a camera of the first mobile device, the streamed video comprising a background and a foreground and being received with a first setting and a second setting, the first setting indicating that only the foreground is to be displayed at a second mobile device and a second setting indicating selection of a background that is to be displayed at the second mobile device, the background being selected based upon a location of the first mobile device;
receiving, by the processor and from the first mobile device, audio captured by the first mobile device using a microphone located at the first mobile device;
determining, by the processor, whether the second mobile device comprises a display device to display the streamed video;
if a determination is made that the second mobile device comprises the display device;
   determining, by the processor, that the background is to be removed from the streamed video based upon the first setting preference,
   extracting the foreground from the streamed video,
   identifying, by the processor, a further background for an output video comprising the foreground, the further background being identified based upon the second setting,
   compiling, by the processor, the further background and the foreground to create the output video to the output video, the further background being selected based on an identification of the second mobile device for receiving the output video, and
   streaming, by the processor, the output video and the audio captured by the first mobile device to the second mobile device; and
if a determination is made that the second mobile device does not comprise the display device, streaming, by the processor, only the audio captured by the first mobile device to the second mobile device.

7. The method of claim 6, further comprising:
receiving a second captured video from the second mobile device;
editing the second captured video to create an edited second captured video; and
combining the edited second captured video into the output video.

8. A method comprising:
receiving, from a mobile device, at a server computer comprising a processor, a streamed video captured by the mobile device using a camera of the mobile device, the streamed video comprising a background and a foreground and being received with a first setting and a second setting, the first setting indicating that only the foreground is to be displayed at a destination device and a second setting indicating selection of a background that is to be displayed at the destination device, the background being selected based upon a location of the mobile device;
receiving, from the mobile device, audio captured by the mobile device using a microphone located at the mobile device;
determining whether the destination device comprises a display device to display the streamed video;
if a determination is made that the destination device comprises the display device,
   determining, by the processor, that the background is to be removed from the streamed video based upon the first setting,
   extracting, by the processor, the foreground from the streamed video,
   identifying, by the processor, a further background for an output video comprising the foreground, the further background being identified based upon the second setting,
   compiling, by the processor, the further background and the foreground to create the output video comprising the further background and the foreground, and
   streaming, by the processor, the output video and the audio captured by the mobile device to the destination device; and
if a determination is made that the destination device does not comprise the display device, streaming only the audio captured by the mobile device to the destination device.

9. The method of claim 8, wherein streaming the output video comprises streaming the output video via a data session conducted over a cellular network, and wherein receiving the streamed video comprises receiving the streamed video via the data session conducted over the cellular network.

10. The method of claim 8, wherein the server computer comprises an application server associated with a cellular network.

11. The method of claim 8, further comprising determining a stream rate for the destination device based upon a capability of the destination device, wherein streaming the output video to the destination device comprises streaming the output video to the destination device at the stream rate, and wherein the capability is indicated by a preference included in a user profile associated with the destination device.

12. The method of claim 8, further comprising:
determining that a voice session is being conducted between the mobile device and the destination device; and
in response to receiving a request for a video session
terminating the voice session, and
initiating a data session, wherein the output video and the audio are streamed during the data session.

13. The method of claim 8, storing, by the processor, the streamed video and the output video in a database.

14. The method of claim 8, further comprising learning, by the processor, a user profile based on previous videoconferencing sessions, wherein the first setting for the background is saved in the user profile.

15. The method of claim 8, further comprising
creating, by the processor, a second output video, wherein the second output video comprises a third background; and
streaming, by the processor, the second output video to a third mobile device, wherein the third mobile device displays the second output video without participating in a videoconference.

16. The system of claim 1, wherein the computer-readable instructions, when executed by the processor, cause the videoconferencing server to perform operations further comprising:
receiving, from the mobile device, a notification indicating a desire to connect to the destination device for a video conference;
signaling the destination device to invite the destination device to connect to the video conference;
determining that the destination device accepts the invitation; and
connecting the mobile device and the destination device in a voice connection.

17. The method of claim 8, wherein the further background comprises a common background.

18. The method of claim 8, further comprising:
receiving, by the processor and from the destination device, a notification to transmit the output video to a set-top box coupled to a television proximate the destination device; and
transmitting, by the processor, the output video to the set-top box.

19. The method of claim 8, further comprising:
receiving, from the mobile device, a notification indicating a desire to connect to the destination device for a video conference;
signaling the destination device to invite the destination device to connect to the video conference;
determining that the destination device accepts the invitation; and
connecting the mobile device and the destination device in a voice connection.

20. The method of claim 19, further comprising:
accessing a user profile associated with the mobile device, the user profile comprising an avatar associated with the mobile device;
initiating the video conference; and
sending the avatar to the destination device when initiating the video conference.

* * * * *